(12) United States Patent
Takahashi et al.

(10) Patent No.: US 11,385,507 B2
(45) Date of Patent: Jul. 12, 2022

(54) ELECTRO-OPTICAL DEVICE

(71) Applicant: Japan Display Inc., Tokyo (JP)

(72) Inventors: Yasuhiro Takahashi, Tokyo (JP); Yuji Maede, Tokyo (JP)

(73) Assignee: JAPAN DISPLAY, INC., Tokyo (JP)

( * ) Notice: Subject to any disclaimer, the term of this patent is extended or adjusted under 35 U.S.C. 154(b) by 0 days.

(21) Appl. No.: 17/111,795

(22) Filed: Dec. 4, 2020

(65) Prior Publication Data

US 2021/0088817 A1 Mar. 25, 2021

Related U.S. Application Data

(63) Continuation of application No. PCT/JP2019/018150, filed on Apr. 26, 2019.

(30) Foreign Application Priority Data

Jun. 6, 2018 (JP) .............................. JP2018-108601

(51) Int. Cl.
*G02F 1/1339* (2006.01)
*G02F 1/1334* (2006.01)
*G02F 1/1335* (2006.01)

(52) U.S. Cl.
CPC .......... *G02F 1/1339* (2013.01); *G02F 1/1334* (2013.01); *G02F 1/133512* (2013.01); *G02F 1/133553* (2013.01)

(58) Field of Classification Search
CPC ................ G02F 1/1339; G02F 1/1334; G02F 1/133512; G02F 1/136209; G02F 1/133553; G02F 2201/34; G02F 2203/02
See application file for complete search history.

(56) References Cited

U.S. PATENT DOCUMENTS

| 2007/0206137 | A1 | 9/2007 | Akiyama | |
| 2009/0141223 | A1* | 6/2009 | Hayashi | G02F 1/1339 349/114 |
| 2013/0076994 | A1* | 3/2013 | Kawaura | G02F 1/1345 349/5 |
| 2017/0261809 | A1 | 9/2017 | Mizuno et al. | |
| 2017/0269433 | A1 | 9/2017 | Sugiyama et al. | |
| 2019/0302548 | A1* | 10/2019 | Lee | H01L 27/124 |

FOREIGN PATENT DOCUMENTS

| JP | 2006-58331 A | 3/2006 |
| JP | 2017-167214 A | 9/2017 |
| JP | 2017-167527 A | 9/2017 |

OTHER PUBLICATIONS

International Search Report and Written Opinion dated May 28, 2019, received for PCT Application No. PCT/JP2019/018150, Filed on Apr. 26, 2019, 7 pages including English Translation.

* cited by examiner

*Primary Examiner* — Angela K Davison
(74) *Attorney, Agent, or Firm* — Xsensus LLP

(57) ABSTRACT

According to one embodiment, an electro-optical device includes a panel, a sealant, a liquid crystal layer, a light source and a reflective layer. The panel includes first and second transparent substrates, an electro-optical area and a peripheral area. The seal is provided in the peripheral area and adheres the substrates. The liquid crystal layer contains a polymer liquid crystal composition. The light source opposes a side surface of the first or second substrates. The reflective layer is between the substrates. The panel includes a first edge, and the reflective layer overlaps a portion of the sealant, located along the first edge.

18 Claims, 13 Drawing Sheets

ELECTRO-OPTICAL DEVICE

CROSS-REFERENCE TO RELATED APPLICATIONS

This application is a Continuation Application of PCT Application No. PCT/JP2019/018150 filed Apr. 26, 2019 and based upon and claiming the benefit of priority from Japanese Patent Application No. 2018-108601, filed Jun. 6, 2018, the entire contents of all of which are incorporated herein by reference.

FIELD

Embodiments described herein relate generally to an electro-optical device.

BACKGROUND

As one example of electro-optical devices in which optical properties are electrically y changed, display devices are conventionally known. Recently, such a display device has been developed, that includes a high-polymer distributed liquid crystal layer which can switch between a scattering state in which light is scattered and a transmissive state in which light is transmitted. In a display device of this type, for example, light from a light source enters a side surface of a panel and propagates inside of the panel. As the light is scattered in a pixel in the scattering state, an image is displayed.

The high-polymer distributed liquid crystal layer is placed between a pair of substrates attached together by sealant. Light from the light source propagates while being totally reflected between both surfaces of the panel, but it is partially absorbed by the sealant. This may cause a decrease in brightness of the image.

DETAILED DESCRIPTION

Figure 1:
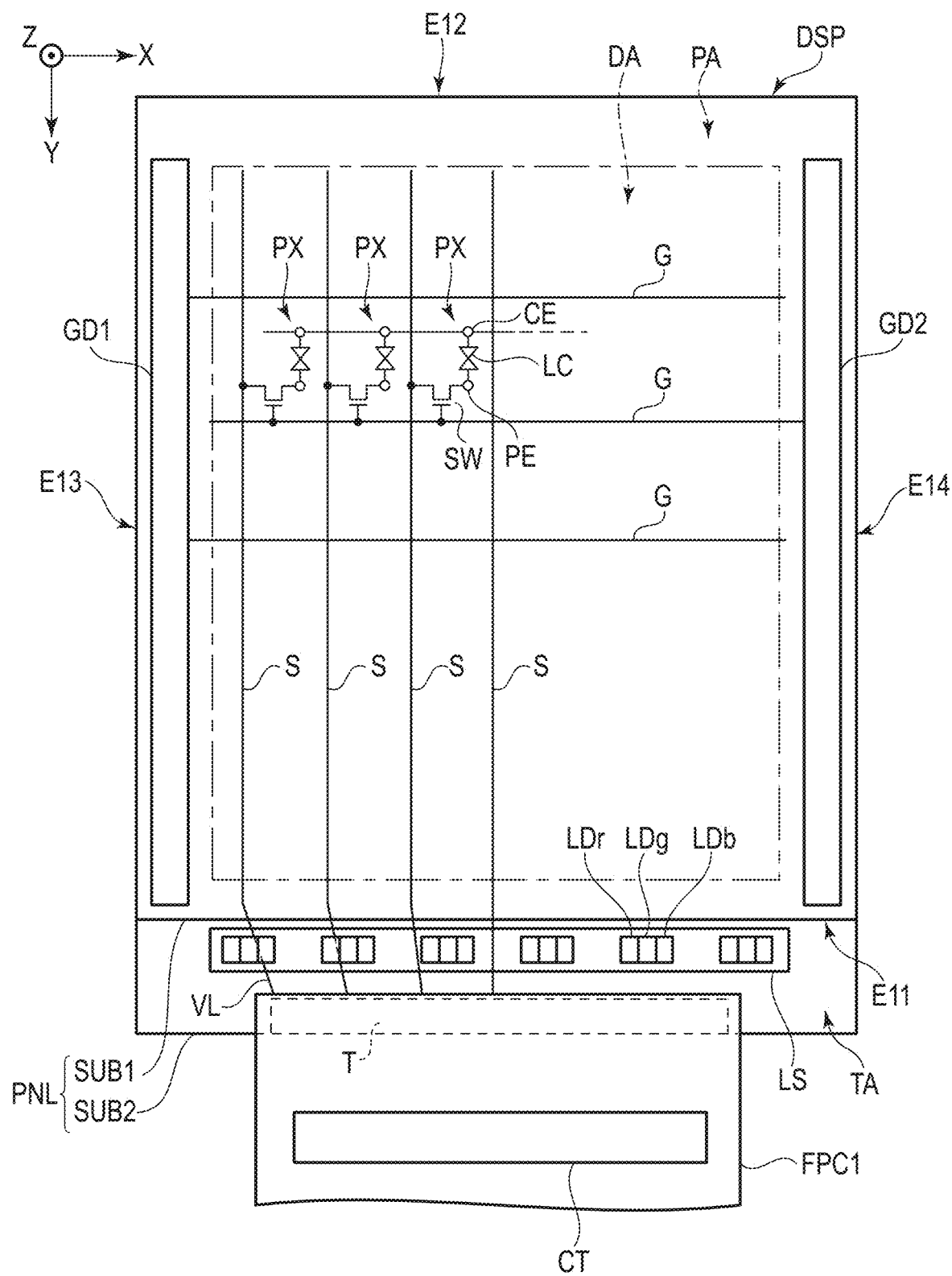
FIG. 1 is a plan view showing a configuration example of a display device (electro-optical device) in the first embodiment.

In general, according to one embodiment, an electro-optical device comprises a panel, a sealant, a liquid crystal layer, a light source and a first reflective layer. The panel comprises a first transparent substrate, a second transparent substrate opposing the first transparent substrate, an electro-optical area and a peripheral area around the electro-optical area. The seal is provided in the peripheral area in plan view and adheres the first transparent substrate and the second transparent substrate. The liquid crystal layer contains a polymer liquid crystal composition and is sealed in between the first transparent substrate and the second transparent substrate with the sealant. The light source opposes a side surface of the first transparent substrate or the second transparent substrate. The first reflective layer is located between the first transparent substrate and the second transparent substrate. Further, the panel includes a first edge in plan view, and the first reflective layer overlaps a portion of the sealant, located along the first edge.

According to such a configuration, an electro-optical device can be provided, which can inhibit absorption of light by sealant and improve the brightness of the image.

Embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings are illustrated schematically, rather than as an accurate representation of what is implemented. However, such schematic illustration is merely exemplary, and in no way restricts the interpretation of the invention. In the drawings, reference numbers of continuously arranged elements equivalent or similar to each other are omitted in some cases. Further, in the specification and drawings, the same elements as those described in connection with preceding drawings are denoted by like reference numbers, and detailed description thereof is omitted unless necessary.

In this specification, expressions such as "α includes A, B, or C", "α includes any one of A, B, and C" and "α includes an element selected from a group consisting of A, B, and C" do not exclude a case where α includes combinations of A, B, and C unless otherwise specified. Furthermore, these expressions do not exclude a case where a includes other elements.

In the expression "first α, second α, and third α" of this specification, "first, second, and third" are convenient numbers used to explain the elements. In other words, an expression "A comprises third α" may indicate a case that A dos not comprise first α and second α other than third α, unless otherwise specified.

In this specification, expressions "member β on/above member α" and "member β under/below member α" may include not only a case where the member α and the member β are in contact with each other, but also a case where some member is intervened between the member α and the member β.

In the embodiments, a liquid crystal display device is disclosed as an example of the display device. However, these embodiments do not prohibit application of the technical idea disclosed in each of the embodiments to other types of electro-optical devices. The other types of the electro-optical devices assumably include, for example, a self-luminous display device comprising a light-emitting diode (LED) or an organic electroluminescent (EL) display element, an electronic paper display device comprising a cataphoretic element, a display device employing microelectromechanical systems (MEMS) and a display device employing electrochromism. Further, the electro-optical device may be of a device other than the display device, such as a screen device which can switch a state where the background of the panel can be seen through and a state where it cannot be seen by electrical control.

First Embodiment

FIG. 1 is a plan view showing a configuration example of a liquid crystal display device DSP (hereinafter referred to as display device DSP) of the first embodiment. In the drawing, a first direction X, a second direction Y and a third direction 2 intersect each other. For example, the first direction X, the second direction Y, and the third direction Z are orthogonal to each other but may intersect at an angle other than 90 degrees.

The display device DSP comprises a display panel PNL, a light source LS, a flexible printed circuit FPC1 and a controller CT. The display panel PNL comprises a first substrate SUB1 (counter-substrate), a second substrate SUB2 (array substrate) and a liquid crystal layer LC sealed between these substrates.

In the example shown in FIG. 1, the display panel PNL comprises a first edge E11, a second edge E12, a third edge E13 and a fourth edge E14. For example, the first edge E11 and the second edge E12 are parallel to the first direction X, and the third edge E13 and the fourth edge E14 are parallel to the second direction Y. In this embodiment, the edges E11 to E14 are equivalent to four edges of the first substrate SUB1 of a rectangular shape. The second substrate SUB2 also has a rectangular shape, and three edges thereof overlap with the edges E12 to E14, respectively. A lower edge of the second substrate SUB2, as viewed in the drawing, projects out with respect to the first edge E11. A portion of the second substrate SUB2, which projects out with respect to the first substrate SUB1 is a terminal area TA, which includes a terminal T for external connection. The first flexible printed circuit FPC1 is connected to the terminal T. Note that the shapes of the first substrate SUB1 and the second substrate SUB2 are not limited to rectangular.

The display panel PNL comprises a display area DA which displays images and a peripheral area PA around the display area DA. The display area DA is an example of an electro-optical area. The peripheral area PA includes the terminal area TA. In the display area DA, the second substrate SUB2 comprises a plurality of scanning signal lines G and a plurality of video signal lines S. The scanning lines G each extend along the first direction X and are arranged along the second direction Y. The signal lines S each extend along the second direction Y and are arranged along the first direction X.

The display area DA includes a plurality of pixels PX arranged in a matrix. Each of the pixels PX on the second substrate SUB2 comprises a pixel electrode PE and a switching element SW. The first substrate SUB1 comprises common electrodes CE which extend over a plurality of pixels PX. To the common electrodes CE, a common voltage is supplied.

The display panel PNL comprises a first scanning line driver GD1 and a second scanning line driver GD2 in the peripheral area PA. In the example shown in FIG. 1, the first scanning line driver GD1 is disposed between the display area DA and the third edge E13, and the second scanning line driver GD2 is disposed between the display area DA and the fourth edge E14. The scanning signal line G extend out in the peripheral area PA and are connected to the first scanning line driver GD1 or the second scanning line driver GD2. The video signal lines S are connected to the terminal T via wiring lines VL provided in the peripheral area PA.

The light source LS is disposed in the terminal area TA. The light source LS comprises a plurality of light-emitting diodes LD opposing the first edge E11. In this embodiment, the light-emitting devices LD include a light-emitting element LDr which emits red light, a light-emitting element LDg which emits green light and a light-emitting element LDb which emits blue light. Note that the light source LS may comprise a light-emitting device LD of a color other than red, green or blue. In FIG. 1, for the sake of convenience, the light-emitting elements LDr, LDg and LDb are arranged along the first direction X, but the light-emitting elements LDr, LDg and LDb may as well be arranged along the third direction Z.

The controller CT controls the first scanning line driver GD1, the second scanning line driver GD2 and the light source LS and also supplies video signal to each video signal line S. In the example shown in FIG. 1, the controller CT is mounted on the first flexible printed circuit FPC1, but the controller CT may be mounted on some other member.

Figure 2:
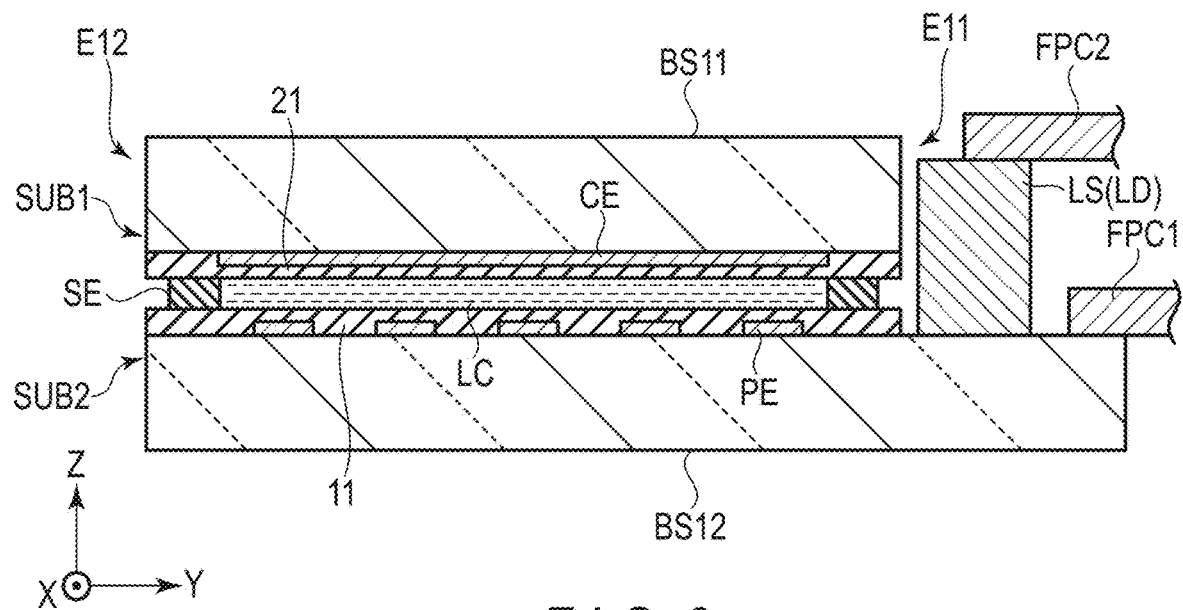
FIG. 2 is a schematic cross-sectional view of the display device of the first embodiment.

FIG. 2 is a schematic cross-sectional view of the display device DSP shown in FIG. 1. Here, only main portions in a cross-section of the display device DSP in a Y-Z plane defined by the second direction Y and the third direction Z will be explained.

The light source LS (light-emitting devices LD) is placed to oppose a side surface of the first substrate SUB1 in the first edge E11. For example, to the light source LS, the second flexible printed circuit FPC2 is connected. For the example, second flexible printed circuit FPC2 is also connected to the controller CT discussed above.

The first substrate SUB1 and the second substrate SUB2 are transparent substrates formed of glass or a resin material. In this embodiment, a transparent substrate of the first substrate SUB1, which the light source LS opposes, is referred to as a first transparent substrate BS11, whereas a transparent substrate of the second substrate SUB2 is referred to as a second transparent substrate BS12.

The second substrate SUB2 further comprises pixel electrodes PE and a first alignment film 11 which covers the pixel electrodes PE. The first substrate SUB1 further comprises common electrodes CE and a second alignment film 21 which covers the common electrode CE. The first substrate SUB1 and the second substrate SUB2 are attached to each other via a sealant SE. The liquid crystal layer LC is placed in a space surrounded by the sealant SE, the first alignment film 11 and the second alignment film 21.

The pixel electrodes PE and the common electrodes CE can be formed from, for example, a transparent conductive material such as indium tin oxide (ITO). The first alignment film 11 and the second alignment film 21 can be formed of, for example, polyimide. The first alignment film 11 and the second alignment film 21 have alignment restriction force which aligns the liquid crystal molecules contained in the liquid crystal layer LC along an initial alignment direction. The alignment restriction force can be imparted, for example, by rubbing treatment, but it may be imparted by some other method such as an optical alignment process or the like.

Figure 3A:
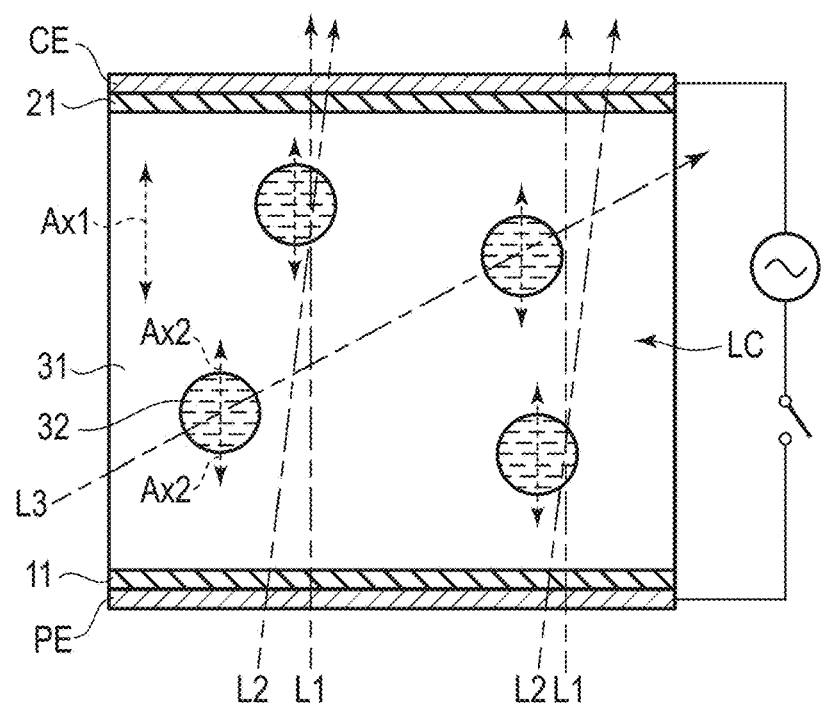
FIG. 3A is a cross-sectional view showing an example of a configuration applicable to a liquid crystal layer in the first embodiment.
Figure 3B:
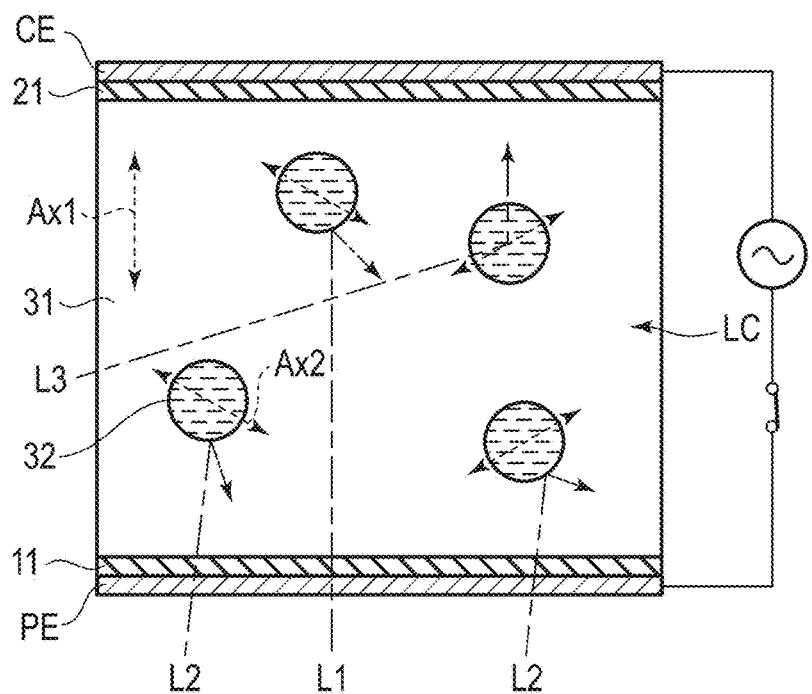
FIG. 3B is a cross-sectional view showing an example of a configuration applicable to the liquid crystal layer in the first embodiment.

FIGS. 3A and 3B are cross sectional diagrams showing an example of the configuration applicable to the liquid crystal layer LC. The liquid crystal layer LC contains a liquid crystal polymer 31 and liquid crystal molecules 32, which are examples of the polymer liquid crystal compositions. The liquid crystal polymer 31 can be obtained by, for example, polymerizing liquid crystal monomers while aligning the monomers along the initial alignment direction by the alignment restriction forces of the first alignment film 11 and the second alignment film 21. The liquid crystal molecules 32 are dispersed in the liquid crystal monomers, and when the liquid crystal monomers are polymerized, the molecules are aligned in a predetermined direction depending on the alignment direction of the liquid crystal monomers.

The liquid crystal molecules 32 may be positive liquid crystal molecules having a positive dielectric anisotropy or negative liquid crystal molecules having a negative dielectric anisotropy. The liquid crystal polymer 31 and the liquid crystal molecules 32 have optical anisotropies equal to each other. Further, the liquid crystal polymer 31 and the liquid crystal molecules 32 have refractive anisotropies approximately equal to each other. The liquid crystal polymer 31 and the liquid crystal molecules 32 have response performances to the respective electric fields, which are different from each other. That is, the response performance to the electric field of the liquid crystal polymer 31 is lower than the response performance to the electric field of the liquid crystal molecules 32.

The example shown in FIG. 3A is equivalent to, for example, a transparent state in which voltage is not applied to the liquid crystal layer LC (a state where a potential difference between the pixel electrode PE and the common electrode CE is zero). In this state, an optical axis Ax1 of the liquid crystal polymer 31 and an optical axis Ax2 of each liquid crystal molecule 32 are parallel to each other.

As described above, the liquid crystal polymer 31 and the liquid crystal molecules 32 have refractive anisotropies approximately equal to each other and also the optical axis Ax1 and Ax2 are parallel to each other. Therefore, in all directions including the first direction X, the second direction Y and the third direction Z, there is no substantial difference in refractive index between the liquid crystal polymer 31 and the liquid crystal molecules 32. Consequently, a light beam L1, which is parallel to the third direction Z and light beams L2 and L3, which are inclined to the third direction Z pass through the liquid crystal layer LC without being scattered substantially at all.

The example shown in FIG. 3B is equivalent to a scattering state where voltage is applied to the liquid crystal layer LC (a state where a potential difference is created between the pixel electrode PE and the common electrode CE). As discussed above, the response performance of the liquid crystal polymer 31 to the electric field is lower than the response performance of the liquid crystal molecules 32 to the electric field. Therefore, while the voltage is being applied to the liquid crystal layer LC, the alignment direction of the liquid crystal polymer 31 does not substantially change, whereas the alignment direction of the liquid crystal molecules 32 changes according to the electric field. Thus, the optical axis Ax2 is inclined with respect to the optical axis Ax1. With this configuration, a great difference in refractive index is created between the liquid crystal polymer 31 and the liquid crystal molecules 32 in all directions including the first direction X, the second direction Y and the third direction Z. In this state, the light beams L1 to L3 entering the liquid crystal layer LC are scattered inside the liquid crystal layer LC.

Note that the configuration of the liquid crystal layer LC is not limited to that of the examples described above. For example, the liquid crystal layer LC may have such a configuration that contain a polymer having a linear cross section, which exhibits an alignment restriction force, and liquid crystal molecules to be aligned by the polymer and creates a scattering state when applying voltage to the liquid crystal layer LC. In other words, the liquid crystal layer LC of this embodiment may take any configuration as along as it employs a polymer liquid crystal composition which can switch between a transmission state and a scattering state by an electric field formed between the pixel electrode PE and the common electrode CE.

Figure 4:
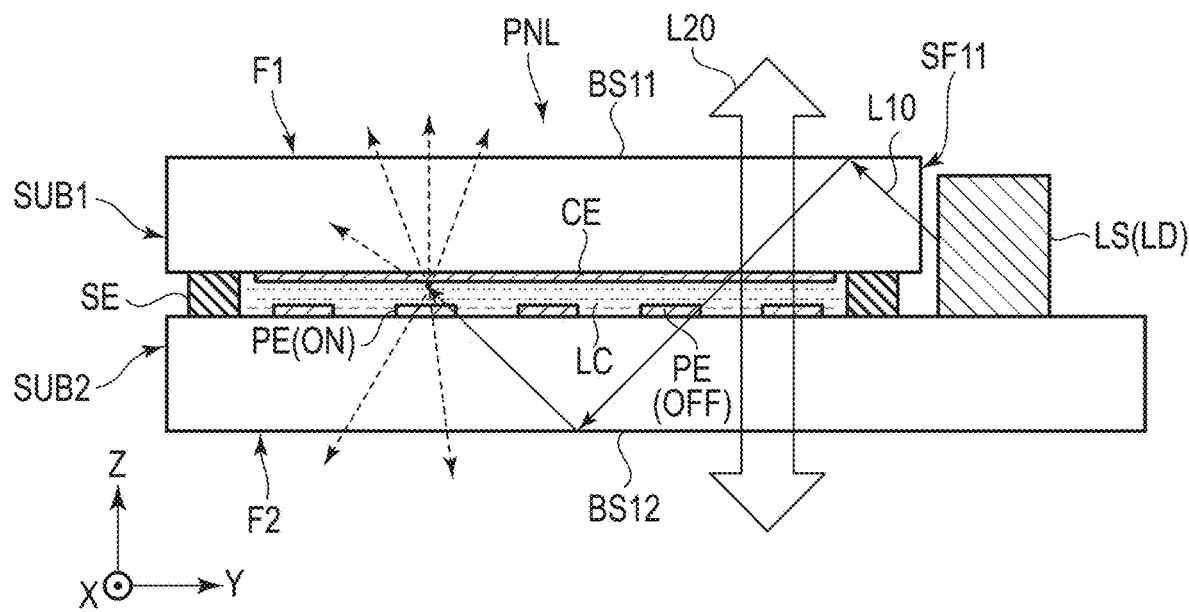
FIG. 4 is a cross-sectional view illustrating image display of the display panel in the first embodiment.

FIG. 4 is a cross-sectional view of the display panel PNL, illustrated to describe the image display using light from the light source LS. A Light beam L10 emitted from the light source LS is made incident on a side surface SF11 of the first transparent substrate BS11 and propagates in the first transparent substrate BS11, the liquid crystal layer LC, the second transparent substrate BS12 and the like. In the vicinity of a pixel electrode PE to which voltage is not applied (indicated as OFF in the figure), the light beam L10 is not substantially scattered by the liquid crystal layer LC. Therefore, the light beam L10 does not substantially leak out from a first surface F1 of the display panel PNL (an upper surface of the first transparent substrate BS11) and a second surface F2 thereof (a lower surface of the second transparent substrate BS12).

On the other hand, in the vicinity of a pixel electrode PE to which voltage is applied (indicated as ON in the figure), the light beam L10 is scattered by the liquid crystal layer LC. The scattered light is emitted from the first surface F1 and the second surface F2 and it is visually recognized as a displayed image.

Note that, in the vicinity of the pixel electrode PE to which voltage is not applied (indicated as OFF in the figure), external light L20 made incident on the first surface F1 or the second surface F2 passes through the display panel PNL without being scattered substantially at all. That is, when viewing the display panel PNL from a second surface F2 side, a background on a first surface F1 side is visible, whereas when viewing the display panel PNL from the first surface F1 side, a background on the second surface F2 side is visible. The image obtained using the light beam L10 from the light source LS is displayed to come out three-dimensionally on such a background.

The display device DSP of the configuration described above can be driven by, for example, a field sequential method. In this method, one frame period contains a plurality of subframe periods (fields). For example, when red, green and blue light-emitting elements LDr, LDg and LDb are involved as in the case of this embodiment, one frame period contains red, green and blue subframe periods.

During the red subframe period, the light-emitting element LDr is turned on and each pixel PX is controlled according to the red image data. Thus, a red image is displayed. Similarly, in the green or blue subframe period, the light-emitting element LDg or LDb is turned on, respectively, and each pixel PX is controlled depending on the green or blue image data, respectively. Thus, a green or blue image is displayed. The red, green and blue images thus displayed by time division are synthesized each other, to be viewed by the user as an image of polychromatic display.

Figure 5:
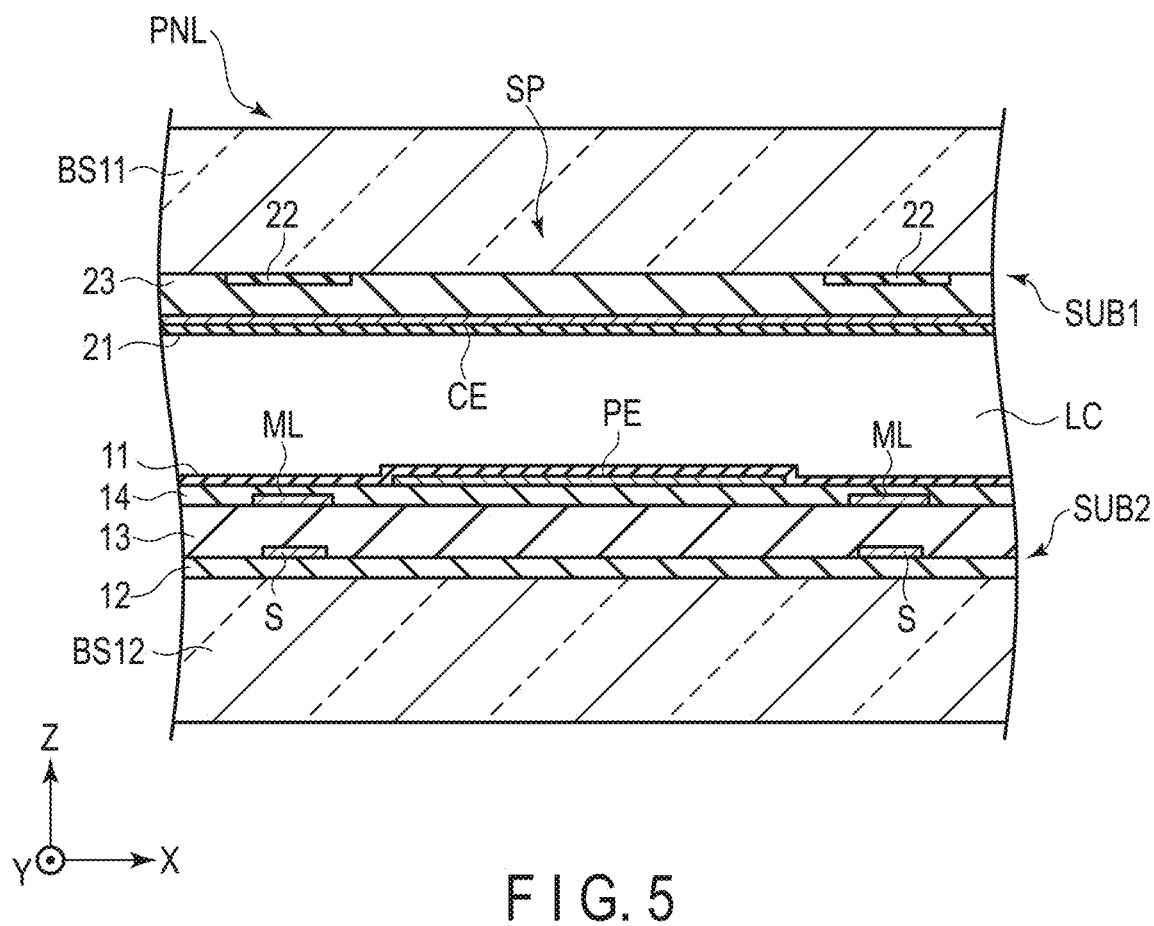
FIG. 5 is a schematic cross-sectional view of the display panel in a display area in the first embodiment.

FIG. 5 is a schematic cross-sectional view of the display panel PNL in the display area DA. The second substrate SUB2 further comprises insulating layers 12 to 14 and a metal layer ML, in addition to the second transparent substrate BS12, the video signal lines S, scanning signal lines G, the pixel electrodes PE and the first alignment film 11, described above. The insulating layer 12 covers the upper surface of the second transparent substrate BS12. The video signal lines S are disposed on the insulating layer 11. Note that the insulating layer 12 may include a plurality of layers to separate the scanning signal lines G, the semiconductor layer of the switching elements SW and the video signal lines S, from each other. The insulating layer 13 covers the video signal lines S and the insulating layer 12. The metal layer ML is disposed on the insulating layer 13. The insulating layer 14 covers the metal layer ML and the insulating layer 13. The pixel electrodes PE are formed on the insulating layer 14. The first alignment film 11 covers the pixel electrodes PE and the insulating layer 14.

The first substrate SUB1 comprises a light-shielding layer 22 and an insulating layer 23 in addition to the first transparent substrate BS11, the common electrodes CE and the second alignment film 21, described above. The light-shielding layer 22 is disposed on a lower surface of the first transparent substrate BS11. The insulating layer 23 covers the light-shielding layer 22 and the lower surface of the first transparent substrate BS11. The common electrode CE covers the insulating layer 23. The second alignment film 21 covers the common electrode CE.

Figure 6:
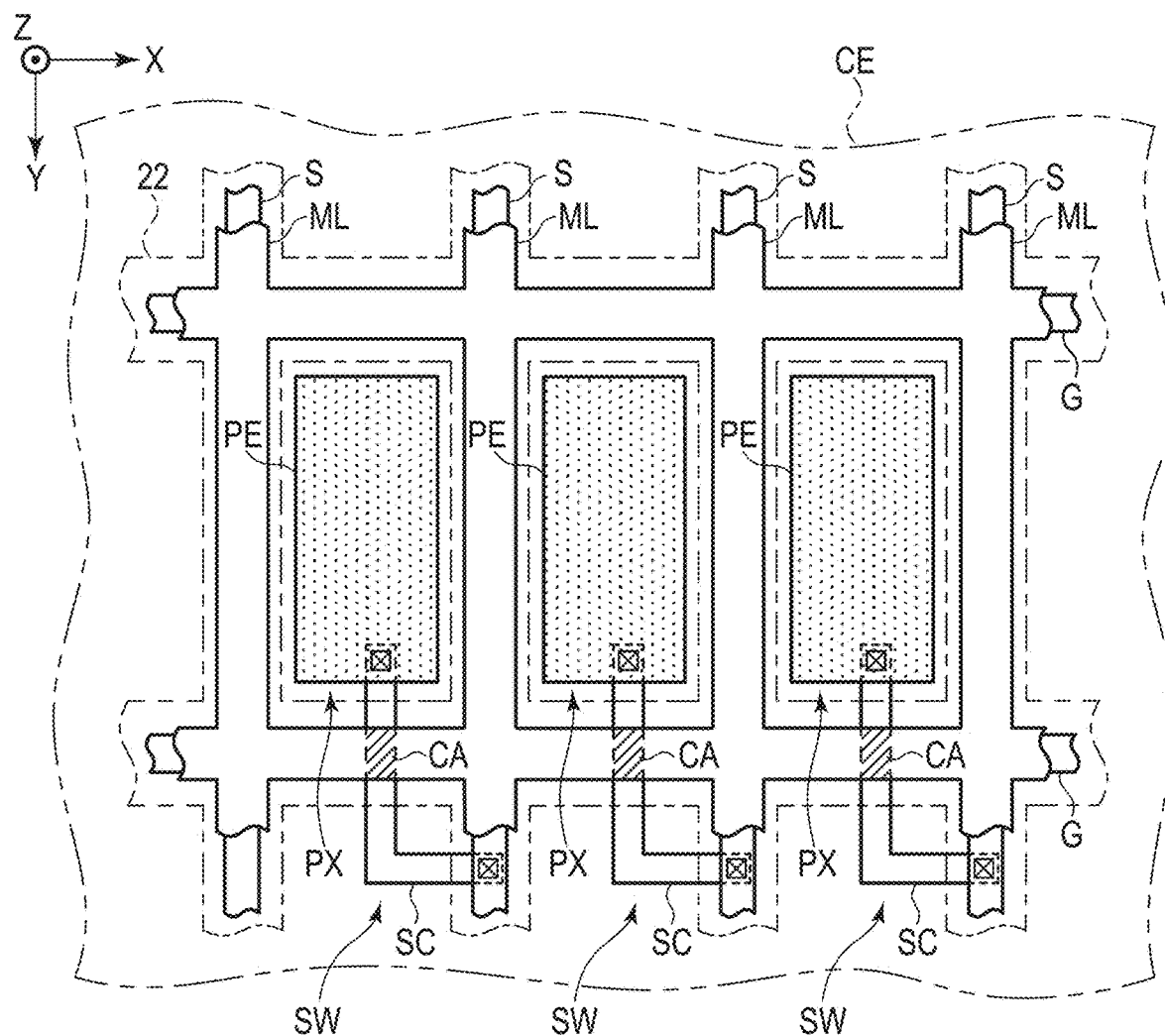
FIG. 6 is a schematic plan view of part of the elements shown in FIG. 5.

FIG. 6 is a schematic plan view of some the elements shown in FIG. 5. Here, a region corresponding to three pixels PX is shown. For example, as illustrated in the drawing, the metal layer ML is disposed on a border of each adjacent pair of pixels PX along the first direction X and a border of each adjacent pair of pixels PX along the second direction Y. The metal layer ML overlap the scanning signals lines G and the video signal lines S. The metal layer ML is electrically connected to the common electrode CE in, for example, the peripheral area PA.

The switching elements SW each comprise a semiconductor layer SC. The semiconductor layer SC is connected to a respective pixel electrode PE and a video signal line S corresponding to this pixel electrode PE. The metal layer ML covers channel regions CA opposing the scanning signal lines G of the semiconductor layers SC, respectively, in plan view. Thus, it is possible to inhibit light propagating from a side surface from entering the channel regions CA and thus an adverse effect which may influence the characteristics of the switching elements SW can be suppressed.

The common electrode CE opposes a plurality of pixel electrodes PE. The common electrode CE may be provided continually over, for example, the entire display area DA. Or, a plurality of common electrodes CE may be disposed with gaps therebetween in the display area DA.

For example, as illustrated in the drawing, the light-shielding layer 22 is disposed on a border of each adjacent pair of pixels PX along the first direction X and a border of each adjacent pair of pixels PX along the second direction Y. The light-shielding layer 22 overlap the scanning signal lines G, the video signal lines S and the metal layer ML. The light-shielding layer 22 is opened in the pixels PX, and a pixel electrode PE is placed in this region. The pixel electrode PE is, for example, rectangular shape, but it is not limited to this example. The light-shielding layer 22 can be formed of, for example, a metallic material. Thus, the light from the light source LS is not easily absorbed by the light-shielding layer 22 as compared to the case of a light-shielding layer 22 formed of a resin material, and the efficiency of use of the light is improved.

Figure 7:
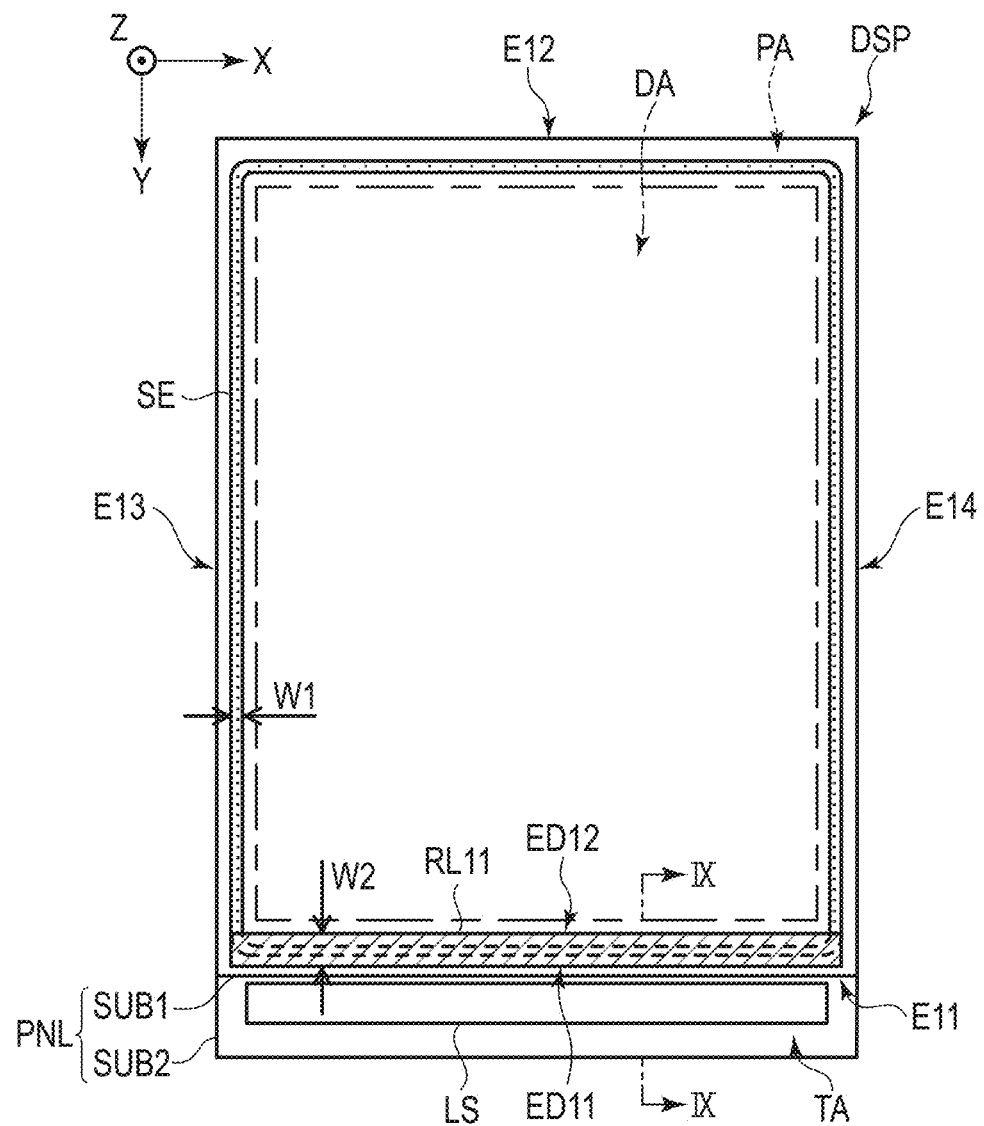
FIG. 7 is a schematic plan view showing shapes of a sealant and a first reflective layer of the display panel in the first embodiment.

FIG. 7 is a schematic plan view of the display panel PNL, which illustrates the shape of the sealant SE. The sealant SE is disposed in the peripheral area PA so as to surround the display area DA. The width of the sealant SE is, for example, W1, which is constant over its entirety, but may partially vary.

While propagating inside the display panel PNL, part of the light from the light source LS is absorbed by the sealant SE. Thus, the brightness of images displayed on the display area DA may decrease. The light from the light source LS is easily absorbed by the sealant SE which extends, for example, between the display area DA and the light source LS. As a measure, in this embodiment, a first reflective layer RL11 is provided between the display area DA and the light source LS so as to suppress the absorption of light by the sealant SE.

In the example shown in FIG. 7, the first reflective layer RL11 a long shape which continually overlap a part of the sealant SE, which is located along the first edge E11. Note here that the first reflective layer RL11 may be of some other shape as long as it at least partially overlap the sealant SE. For example, the first reflective layer RL11 has a width W2, which is constant over its entire length along the second direction Y. It is preferable that the width W2 be greater than the width W1 of the sealant SE (W2>W1).

The first reflective layer RL11 comprises a first end portion ED11 on a light source LS side and a second end portion ED12 on a display area DA side along the second direction Y. In the example shown in FIG. 7, the first end portion ED11 is located between the first edge E11 and the sealant SE, and the second end portion ED12 in located between the display area DA and the sealant SE. As another example, at least one of the first end portion ED11 and the second end portion ED12 may overlap the sealant SE. Or the first end portion ED11 may overlap the first edge E11.

Figure 8:
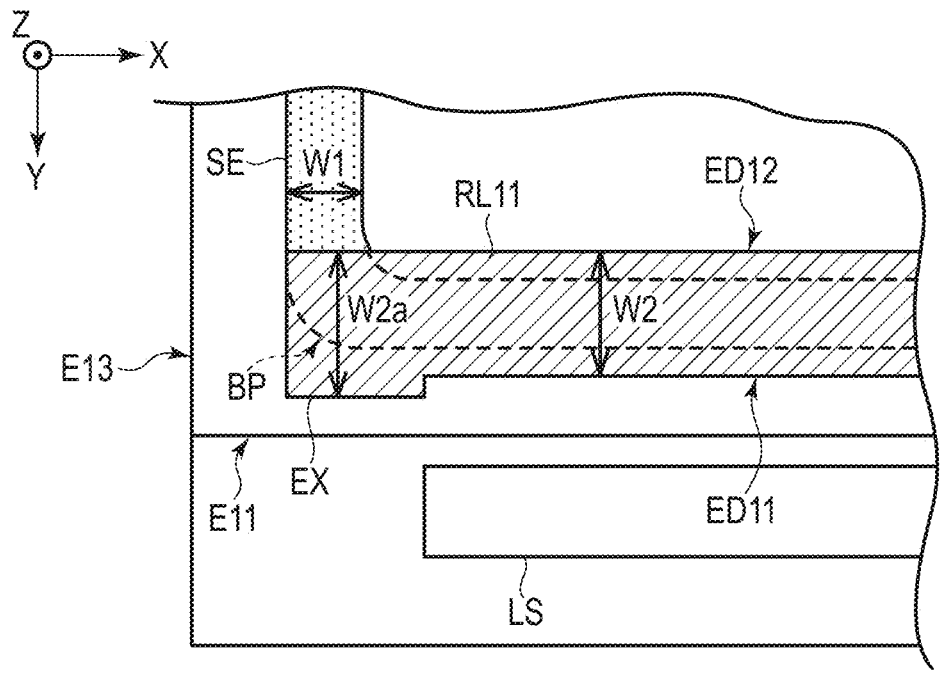
FIG. 8 is a plan view showing an example of a configuration in which a width of the first reflective layer varies from one part to another.

Note that the width of the first reflective layer RL11 may partially vary. FIG. 8 is a plan view showing a configuration example of the first reflective layer RL11 whose width partially varies. Here, a vicinity of a corner portion made by of the first edge E11 and the third edge E13 is shown. The first reflective layer RL11 includes an extended portion EX in an end portion near the corner portion.

The extended portion EX may be of such a shape that the first end portion ED11 projects out towards the first edge E11, for example, as illustrated in the figure, or may be of a shape that the second end portion ED12 projects in a direction opposite to this. Or, it may be of a shape in which both end portions ED11 and ED12 project out. The width of the extended portion EX along the second direction Y is W2a, which is larger than W2 (W2a>W2).

The sealant SE includes a bend portion BP bent along the corner portion made by the first edge E11 and the third edge E13. In the bent portion BP, the width of the sealant SE can be increased. With the extended portion EX provided, light made incident on the bend portion BP of the sealant SE is appropriately reflected, thereby making it possible to reduce the amount of the light absorbed in the sealant SE. The extended portion EX may be further provided in a bend portion of the sealant SE along the corner portion made of the first edge E11 and the fourth edge E14.

Figure 9:
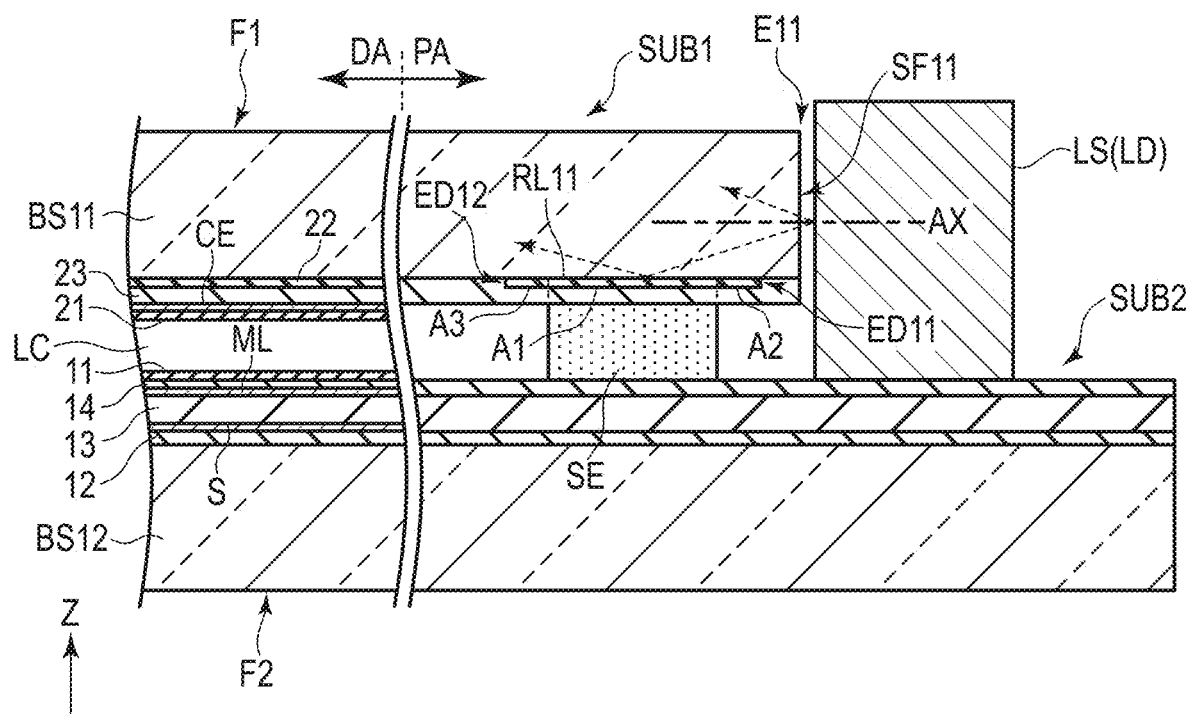
FIG. 9 is a cross-schematic sectional view of the display device taken along line IX-IX in FIG. 7.

FIG. 9 is a schematic cross-sectional view of the display device DSP, taken along line IX-IX in FIG. 7. In this embodiment, a central axis AX of the light source LS is set to oppose the side surface SF11 of the first transparent substrate BS11. The central axis AX is an optical axis at which the intensity of the light (diffused light) emitted by the light-emitting device LD is at maximum and is parallel to, for example, the second direction Y. If the locations of the light-emitting elements LDr, LDg and LDb along the third direction Z are displaced from each other, as in the example discussed above, in which the light-emitting elements LDr, LDg and LDb stacked along the third direction Z, the central axis AX may be set at an average position of the optical axes of the light-emitting elements LDr, LDg and LDb along the third direction Z, or may be at the optical axis of the light-emitting element at the center.

The first reflective layer RL11 is located between the first transparent substrate BS11 and the sealant SE. From another point of view, the first reflective layer RL11 is located between the central axis AX and the sealant SE. When the first reflective layer RL11 is disposed at such a position, the light from the light source LS toward the sealant SE can be effectively reflected.

For example, the first reflective layer RL11 can be formed of the same metallic material as that of the light-shielding layer 22 in the same layer as the light-shielding layer 22. In this case, the light-shielding layer 22 and the first reflective layer RL11 can be formed by one operation in the same manufacturing step.

The light reflectance of the first reflective layer RL11 is higher than the light absorptivity of the sealant SE. For example, when the first reflective layer RL11 contains aluminum or an aluminum alloy, a high reflectance can be obtained. The first reflective layer RL11 should not necessarily be of a single-layer structure, but may be of a stacked multi-layered structure. In this case, the first reflective layer RL11 may have a structure of, for example, titanium/aluminum/titanium (TAT) or molybdenum/aluminum/molybdenum (MAM). Apart from the above, various kinds of structures including a multi-layered structure including an inorganic film, are applicable to the first reflective layer RL11.

In the example shown in FIG. 9, the light-shielding layer 22 and the first reflective layer RL11 are formed on the lower surface of the first transparent substrate BS11, but the configuration is not limited to that of this example. As another example, an insulating layer and an electro-conductive layer may be interposed between the light-shielding layer 22 and the first reflective layer RL11, and the first transparent substrate BS11. Further, the first reflective layer RL11 may be disposed in a layer other than that of the light-shielding layer 22.

In the example shown in FIG. 9, the first reflective layer RL11 is covered by the insulating layer 23. Further, the alignment films 11 and 21 are not located in the vicinity of the sealant SE, and the sealant SE is in contact with the insulating layers 14 and 23. In this configuration, the first reflective layer RL11 and the sealant SE oppose each other via the insulating layer 23. As still another example, the first reflective layer RL11 may be in contact with the sealant SE. Or, between the first reflective layer RL11 and the sealant SE, the second alignment film 21 may be interposed.

When an electric field is produced between the first reflective layer RL11 and the common electrode CE, or between the first reflective layer RL11 and the light-shielding layer 22, the electric field may act on the liquid crystal layer LC, thereby causing an affect the display. Under these circumstances, it is preferable that the common voltage should be applied to the first reflective layer RL11 and the light-shielding layer 22 as in the case of the common electrodes CE. The common voltage may be a direct current voltage or an alternating voltage. Note that the voltage of the first reflective layer RL11 is not limited to the common voltage, but may be, for example, a low voltage (VGL voltage), which is the same as that of the scanning signal lines G when the scanning signal is not supplied thereto, or a ground voltage.

The first reflective layer RL11 includes a first area A1 opposing the sealant SE. As mentioned above, when the first end portion ED11 is located between the sealant SE and the first edge E11, the first reflective layer RL11 includes a second area A2 located between the first area A1 and the first end portion ED11. Further, as described above, when the second end portion ED12 is located between the sealant SE and the display area DA, the first reflective layer RL11 includes a third area A3 located between the first area A1 and the second end portion ED12.

For example, the widths of the second area A2 and the third area A3 along the second direction Y are less than the width of the first area A1 along the second direction Y. With the second area A2 and the third area A3 provided, the entire region of the sealant SE along its width direction can be set to oppose the first reflective layer RL11 even if the location of the sealant SE formed with respect to the first reflective layer RL11 is displaced.

The sealant SE is transparent, but absorbs part of the incident light. In this embodiment, the light from the light source LS directly to the sealant SE and the light reflected by the first surface F1 and directed to the sealant SE are reflected mainly by the first area A1. Thus, the amount of light absorbed in the sealant SE can be reduced, and as a result, the brightness of images displayed on the display area DA can be increased.

Furthermore, when the second area A2 is provided, the first reflective layer RL11 and the sealant SE can be placed to appropriately overlap each other even if the width of the sealant SE varies.

In this embodiment, the first reflective layer RL11 is disposed in the vicinity of the first edge E11 on a light source LS side, but the first reflective layer RL11 is not provided in the vicinities of the other edges E12 to E14. With this configuration, the transmittance of the display panel PNL can be raised in the vicinities of the edges E12 to E14.

Note that this embodiment discusses an example case where the light source LS and the first reflective layer RL11 are disposed along an edge on a terminal area TA side. But, the light source LS and the first reflective layer RL11 may be placed along some other edge.

Note that, as the sealant for display devices, an ultraviolet-curing resin is generally employed. In this case, two substrates are attached together a sealant before curing, and then ultraviolet light is irradiated from either one side of the substrates to cure the sealant. When the first reflective layer RL11 is provided on the first substrate SUB1 as in this embodiment, it is difficult to irradiate UV light onto the sealant SE from a first substrate SUB1 side. Therefore, it is preferable to irradiate the light from a second substrate SUB2 side. When a plurality of metal wires are formed in a region of the second substrate SUB2, which overlaps the sealant SE, it is preferable to form an opening in the metal wires to transmit the ultraviolet light. Or, the sealant SE may be formed from a thermosetting resin, and the sealant SE may be cured by heating, in place of the irradiation of ultraviolet light or together with the irradiation of ultraviolet light. In this case, a thermosetting agent may be added to the sealant SE to promote curing.

Second Embodiment

Figure 10:
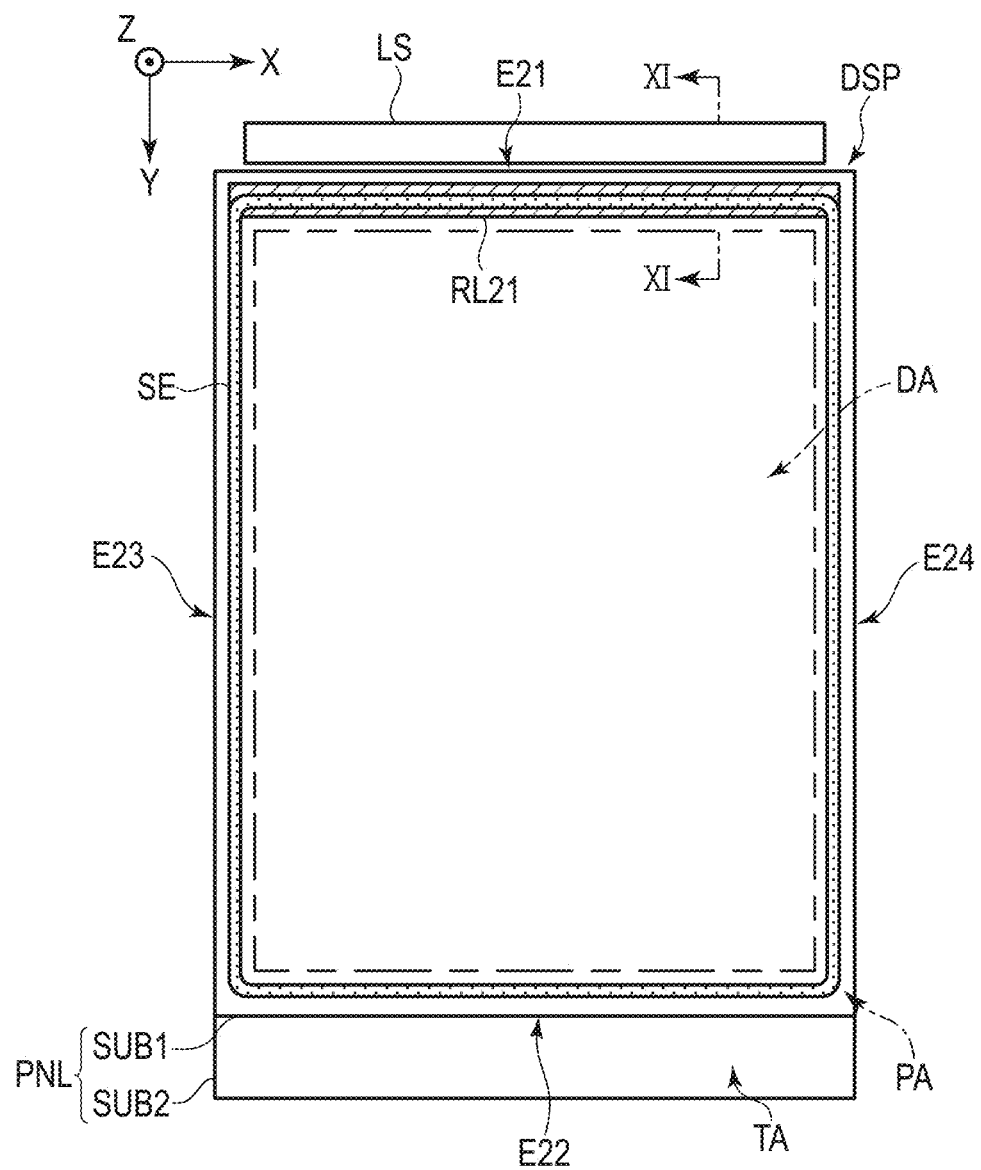
FIG. 10 is a schematic plan view showing a display device of the second embodiment.

The second embodiment will now be described. As to the structure not to particularly discussed here, a configuration similar to that of the first embodiment is applicable. FIG. 10 is a schematic plan view of a display device DSP of this embodiment. In this embodiment, the light source LS is disposed on an opposite side to the terminal area TA. Further, a first edge E21, a second edge E22, a third edge E23 and a fourth edge E24 of the display panel PNL are defined as illustrated in the drawing. The first edge E21 is equivalent to an edge of each of the substrates SUB1 and SUB2 between the light source LS and the display area DA. The second edge E22 is equivalent to an edge of the first substrate SUB1 on a terminal area TA side. The third edge E23 and the fourth edge E24 are equivalent to edges of each of the substrates SUB1 and SUB2, which are parallel to the second direction Y.

Between the display area DA and the light source LS, the first reflective layer RL21 is disposed. To the positions of the planar shape of the first reflective layer RL21 and the sealant SE in relation to each other, a configuration similar to that of the first reflective layer RL11 of the first embodiment is applicable.

Figure 11:
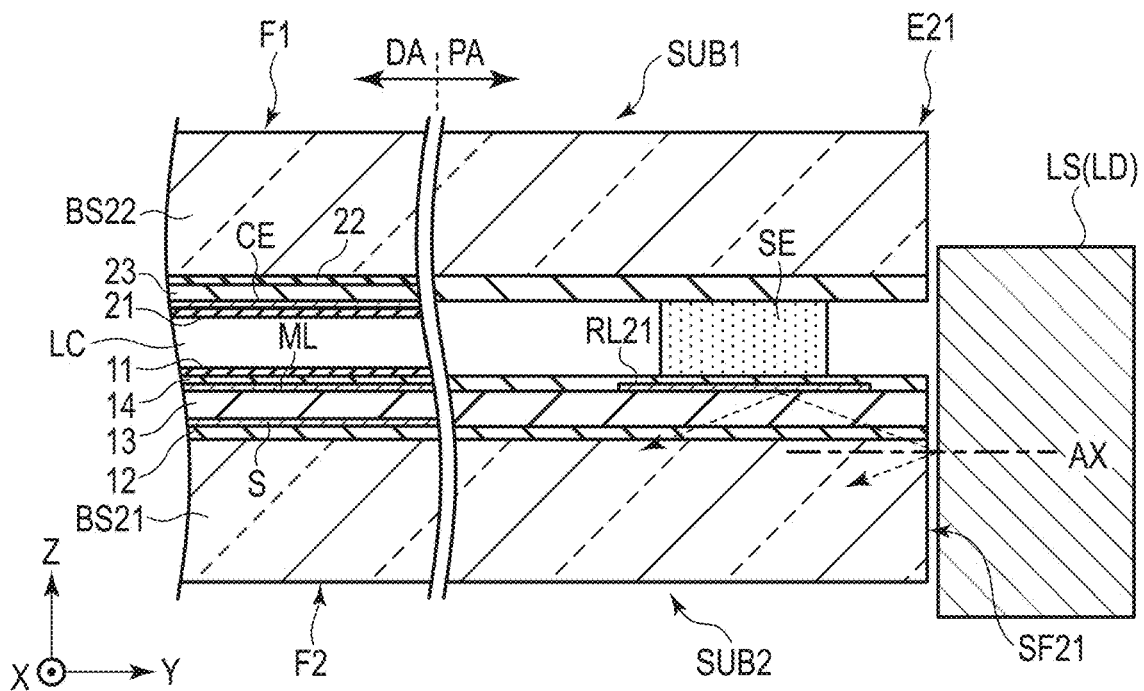
FIG. 11 is a schematic cross-sectional view showing the display device taken along line XI-XI in FIG. 10.

FIG. 11 is a schematic cross-sectional view of the display device DSP, taken along line XI-XI in FIG. 10. In this embodiment, the central axis AX of the light source LS opposes the second substrate SUB2. Hereinafter, a transparent substrate of the second substrate SUB2 is referred to as a first transparent substrate BS21, and a transparent substrate of the first substrate SUB1 is referred to as a second transparent substrate BS22. In the example shown in FIG. 11, the central axis AX opposes a side surface F21 of the first transparent substrate BS21, but the central axis AX may be set to oppose the insulating layers 12 and 13 and the like.

The first reflective layer RL21 is located between the first transparent substrate BS21 and the sealant SE. From another point of view, the first reflective layer RL21 is located between the central axis AX and the sealant SE. For example, the reflective layer 30 can be formed from the same metal material as that of the metal layer ML in the same layer as that of the metal layer ML. In this case, the metal layer ML and the first reflective layer RL21 can be formed by one operation in the same manufacturing step. The relationship in terms of cross-sectional shape between the first reflective layer RL21 and the sealant SE is similar to that of the first reflective layer RL11 and the sealant SE in the first embodiment.

The light reflectance of the first reflective layer RL21 is higher than the light absorptivity of the sealant SE. To the first reflective layer RL21, a material and configuration similar to those of the first reflective layer RL11 in the first embodiment is applicable. As in the case of the first reflective layer RL11 of the first embodiment, it is preferable to apply the common voltage to the first reflective layer RL21, but some other voltage may be applied.

In the example shown in FIG. 11, the metal layer ML and the first reflective layer RL21 are formed on the insulating layer 13, but the configuration is not limited to that of this example. For example, the metal layer ML and the first reflective layer RL21 may be disposed below the insulating layer 13. Further, the first reflective layer RL21 may be placed in a layer different from that of the metal layer ML.

In the example shown in FIG. 11, an insulating layer 14 is interposed between the first reflective layer RL21 and the sealant SE, but the first reflective layer RL21 may be in contact with the sealant SE. Further, between the first reflective layer RL21 and the sealant SE, the first alignment film 11 may be interposed.

In the case where the central axis AX of the light source LS opposes the second substrate SUB2, the first reflective layer RL21, such as that of this embodiment, can appropriately inhibit entry of the light from the light source LS to the sealant SE. Apart from this, advantageous effects similar to those of the first embodiment can also be obtained by this embodiment.

Note that this embodiment discusses an example case where the light source LS and the first reflective layer RL21 are disposed along an edge on an opposite side to the terminal area TA. But, the light source LS and the first reflective layer RL21 may be placed along some other edge.

Further, note that when the first reflective layer RL21 is provided on the second substrate SUB2 as in this embodiment, it is difficult to irradiate ultraviolet light onto the sealant SE from the second substrate SUB2 side. Here, no light-shielding layer is formed in a region of the first substrate SUB1, which overlap the sealant SE, and therefore it is preferable to irradiate ultraviolet light to cure the sealant SE from the first substrate SUB1 side.

Third Embodiment

Figure 12:
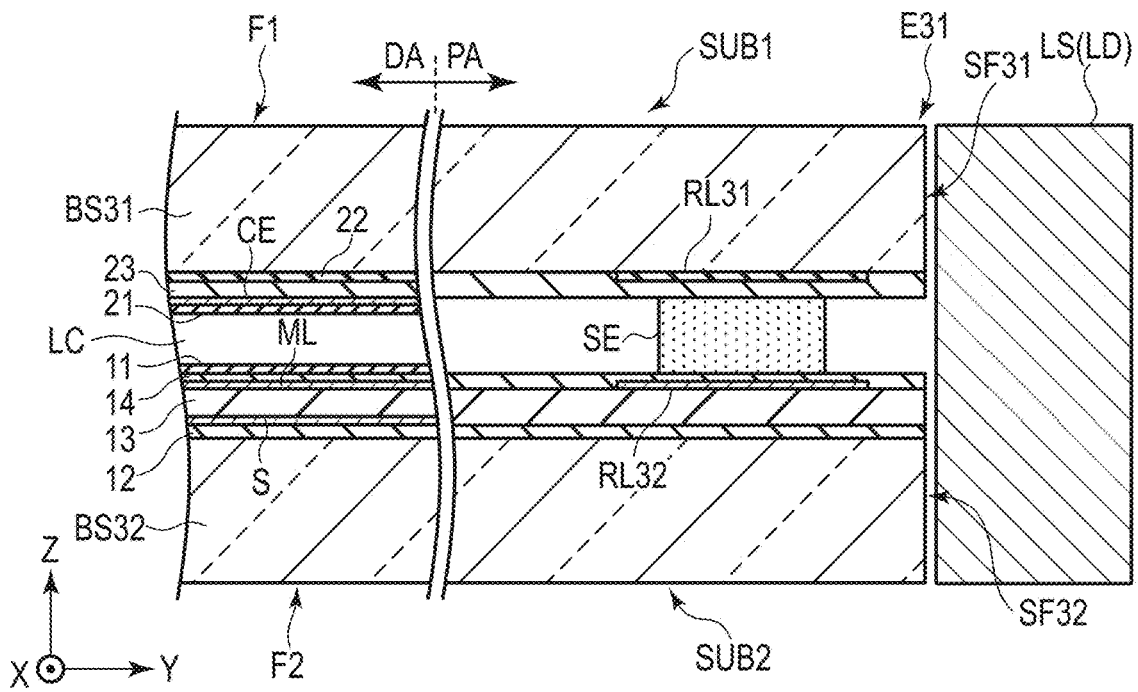
FIG. 12 is a schematic cross-sectional view showing a display device of the third embodiment.

The third embodiment will now be described. As to the structure not to particularly discussed here, a configuration similar to that of each embodiment discussed above is applicable. FIG. 12 is a schematic cross-sectional view of a display device DSP of this embodiment. In this embodiment, the light source LS is set to oppose both of the first substrate SUB1 and the second substrate SUB2.

Hereinafter, a transparent substrate of the first substrate SUB1 is referred to as first transparent substrate BS31, and a transparent substrate of the second substrate SUB2 is referred to as a second transparent substrate BS32. The central axis of the light source LS may oppose a side surface SF31 of the first transparent substrate BS31, or oppose a side surface SF32 of the second transparent substrate BS32, or oppose a region between the transparent substrates BS31 and BS32.

The light source LS is placed along a first edge E31 of the display panel PNL. The first edge E31 may be an edge on an opposite side of the terminal area TA as in the case of, for example, the first edge E21 shown in FIG. 10, or may be some other edge.

Between the light source LS and the display area DA, the first reflective layer RL31 and the second reflective layer RL32 are disposed. The first reflective layer RL31 and the second reflective layer RL32 oppose each other with a sealant SE interposed therebetween. To the positions of the planar shape of the reflective layers RL31 and RL32 and the sealant SE in relation to each other, a configuration similar to that of the first reflective layer RL11 of the first embodiment or the first reflective layer RL21 of the second embodiment is applicable.

The first reflective layer RL31 is located between the first transparent substrate BS31 and the sealant SE. The first reflective layer RL31 can be formed from the same metallic material as that of the light-shielding layer 22 in the same layer as that of the light-shielding layer 22 as in the case of the first reflective layer RL11 in the first embodiment. Apart from this, to the position of the first reflective layer RL31 disposed and the configuration thereof, various examples discussed in connection with the first reflective layer RL11 of the first embodiment are applicable.

The second reflective layer RL32 is located between the second transparent substrate BS32 and the sealant SE. The second reflective layer RL32 can be formed from the same metallic material as that of the metal layer ML in the same layer as that of the metal layer ML as in the case of the first reflective layer RL21 in the second embodiment. Apart from this, to the position of the second reflective layer RL32 disposed and the configuration thereof, various examples discussed in connection with the first reflective layer RL21 of the second embodiment are applicable.

It is preferable to apply the same voltage to the first reflective layer RL31 and the second reflective layer RL32. If different voltages are applied to the respective reflective layers RL31 and RL32, an electric field is produced therebetween, and the electric field may act on the liquid crystal layer LC to cause an influence on display. In contrast, the voltages of the reflective layers RL31 and RL32 are the same, an electric field is not formed therebetween, thereby making it possible to inhibit the influence on the display. It is preferable that the voltage applied to the reflective layers RL31 and RL32 be the common voltage as in the case of the first reflective layer RL11 in the first embodiment, but it may be some other voltage.

When the first reflective layer RL31 and the second reflective layer RL32 are provided as in the this embodiment, both of the light of the light source LS towards the sealant SE from the first transparent substrate BS31 side and the light of the light source LS towards the sealant SE from the second transparent substrate BS32 side can be reflected so as not to be made incident on the sealant SE.

When the reflective layers RL31 and RL32 are provided on the respective sides of the sealant SE as in this embodiment, it is difficult to irradiate ultraviolet light onto the sealant SE. Under these circumstances, ultraviolet light may be propagated between the reflective layers RL31 and RL32 to be irradiated onto the sealant SE. Or, the sealant SE may be formed from a thermosetting resin, and the sealant SE may be cured by heating, in place of the irradiation of ultraviolet light or together with the irradiation of ultraviolet light. In this case, a thermosetting agent may be added to the sealant SE to promote curing.

Fourth Embodiment

Figure 13:
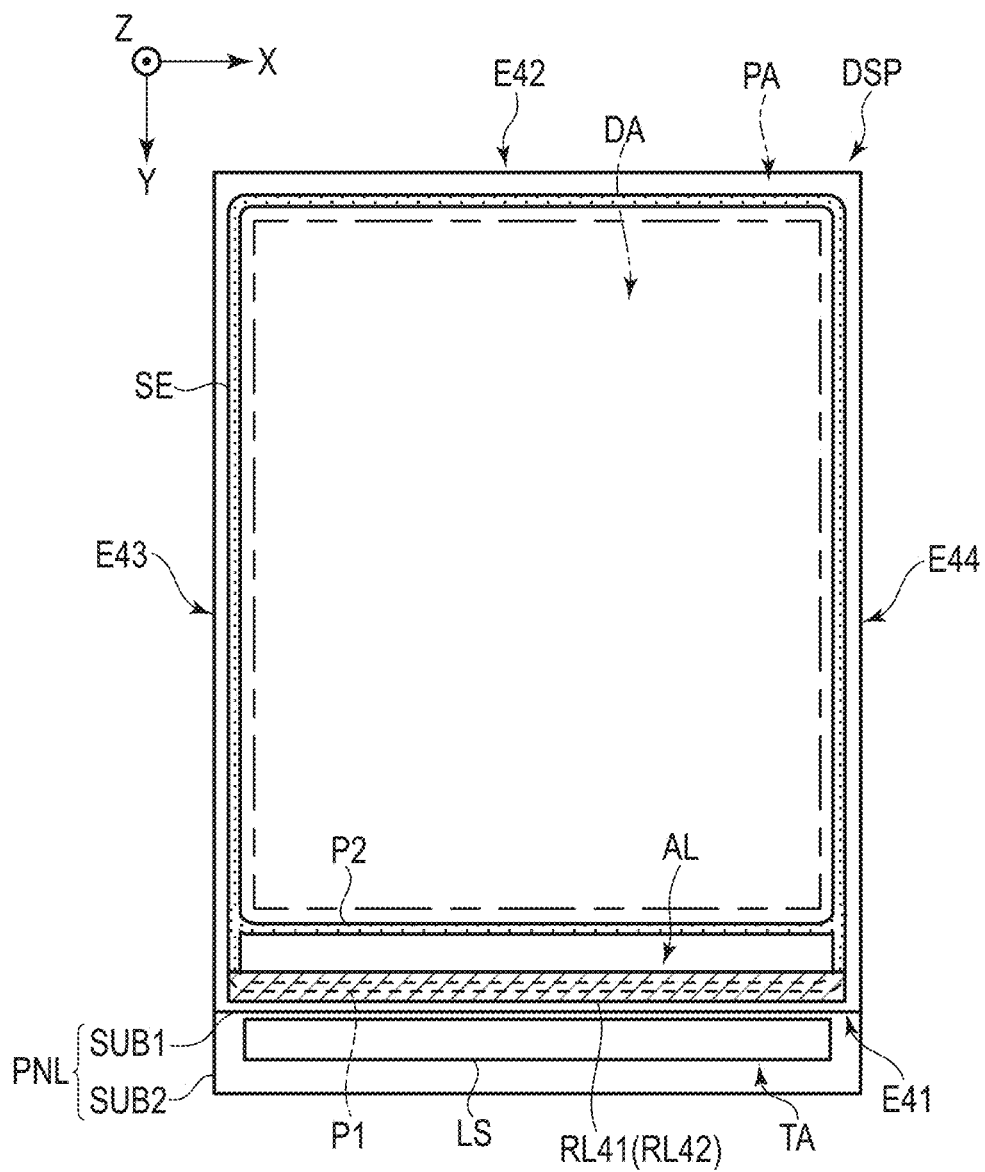
FIG. 13 is a schematic plan view showing a display device of the fourth embodiment.

The fourth embodiment will now be described. As to the structure not to particularly discussed here, a configuration similar to that of each embodiment discussed above is applicable. FIG. 13 is a schematic plan view of a display device DSP of this embodiment. In this embodiment, the light source LS is disposed in the terminal area TA as in the case of the first embodiment. Furthermore, a first edge E41, a second edge E42, a third edge E43 and a fourth edge E44 of the display panel PNL are defined as illustrated in the drawing. The first edge E41 is equivalent to an edge of the first substrate SUB1, located between the light source LS and the display area DA. The second edge E42 is equivalent to an edge of each of the substrates SUB1 and SUB2 on an opposite side to the terminal area TA. The third edge E43 and the fourth edge E44 are equivalent to respective edges of each of the substrates SUB1 and SUB2, which are parallel to the second direction Y.

The sealant SE includes a first portion P1 and a second portion P2 along the first edge E41. The first portion P1 is located between the first edge E41 and the second portion P2. The second portion P2 is located between the first portion P1 and the display area DA. The first portion P1 and the second portion P2 have the same width along the second direction Y. But, they may be different in width. For example, the width of the first portion P1, closer to the light source LS, may be greater than the width of the second portion P2.

Between the display area DA and the light source LS, an air layer AL (an atmospheric layer) is formed, which is surrounded by the first portion P1, the second portion P2, the first substrate SUB1 and the second substrate SUB2. With the air space AL thus provided, an interface between the sealant SE and the air space AL increases, thereby making it easy for total reflection to occur therebetween. Thus, such a drawback that external light is absorbed in or reflected by various types of wiring lines in the peripheral area PA of the second substrate SUB2, and the efficiency of use of the light is improved.

The display panel PNL comprises a first reflective layer RL41 which overlaps the first portion P1. To the positions of the planar shape of the reflective layers RL41 and RL42 and the sealant SE (the portions P1 and P2) in relation to each other, the cross-sectional structure thereof and the like, a configuration similar to that of the first reflective layer RL11 of the first embodiment or the first reflective layer RL21 of the second embodiment is applicable. Further, as in the case of the second reflective layer RL32 of the third embodiment, a second reflective layer RL42 opposing the first reflective layer RL41 may be provided.

In the example shown in FIG. 13, no reflective layer is provided to overlap the second portion P2. Thus, by not providing a reflective layer for the second portion P2 near the display area DA, the transmissive region around the display area DA can be expanded. But, a reflective layer opposing the second portion P2 may be provided. In this case, the light absorption by the second portion P2 can be reduced.

Note that this embodiment discusses an example case where the light source LS, the first portion P1, the second portion P2 and the first reflective layer RL41 are disposed along an edge on the terminal area TA side. But these members may be placed along some other edge.

Fifth Embodiment

Figure 14:
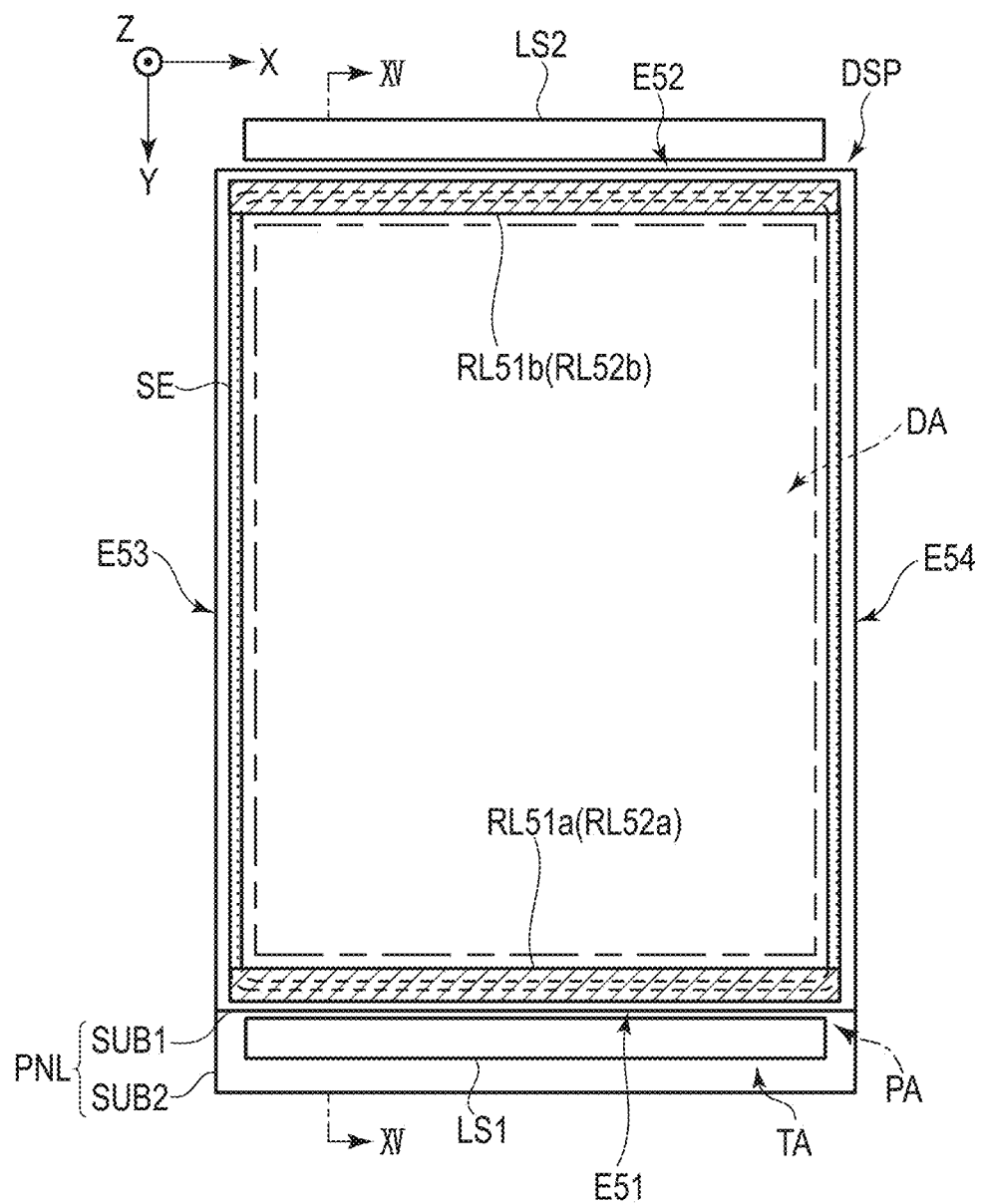
FIG. 14 is a schematic plan view showing a display device of the fifth embodiment.

The fifth embodiment will now be described. As to the structure not to particularly discussed here, a configuration similar to that of each embodiment discussed above is applicable. FIG. 14 is a schematic plan view of a display device DSP of this embodiment. In this embodiment, a first light source LS1 is placed in the terminal area TA and a second light source LS2 is placed on an opposite side to the terminal area TA.

Further, a first edge E51, a second edge E52, a third edge E53 and a fourth edge E54 of the display panel PNL are defined as illustrated in the drawing. The first edge E51 is equivalent to an edge of the first substrate SUB1, located between the first light source LS1 and the display area DA. The second edge E52 is equivalent to an edge of each of the substrates SUB1 and SUB2 on an opposite side to the terminal area TA. The third edge E53 and the fourth edge E54 are equivalent to edges of each of the substrates SUB1 and SUB2, which are parallel to the second direction Y.

Between the display area DA and the first light source LS1, a first reflective layer RL51a is disposed. Between the display area DA and the second light source LS2, a first reflective layer RL51b is disposed. The first reflective layer RL51a overlap a portion of the sealant SE, which is located along the first edge E51. The first reflective layer RL51b overlaps a portion of the sealant SE, which is located along the second edge E52. To the positions of the planar shape of the first reflective layers RL51a and RL51b and the sealant SE in relation to each other, the cross-sectional structure thereof and the like, a configuration similar to that of the first reflective layer RL11 of the first embodiment or the first reflective layer RL21 of the second embodiment is applicable. As in the case of the second reflective layer RL32 of the third embodiment, second reflective layers RL52a and RL52b opposing the first reflective layers RL51a and RL51b may be provided, respectively.

Figure 15:
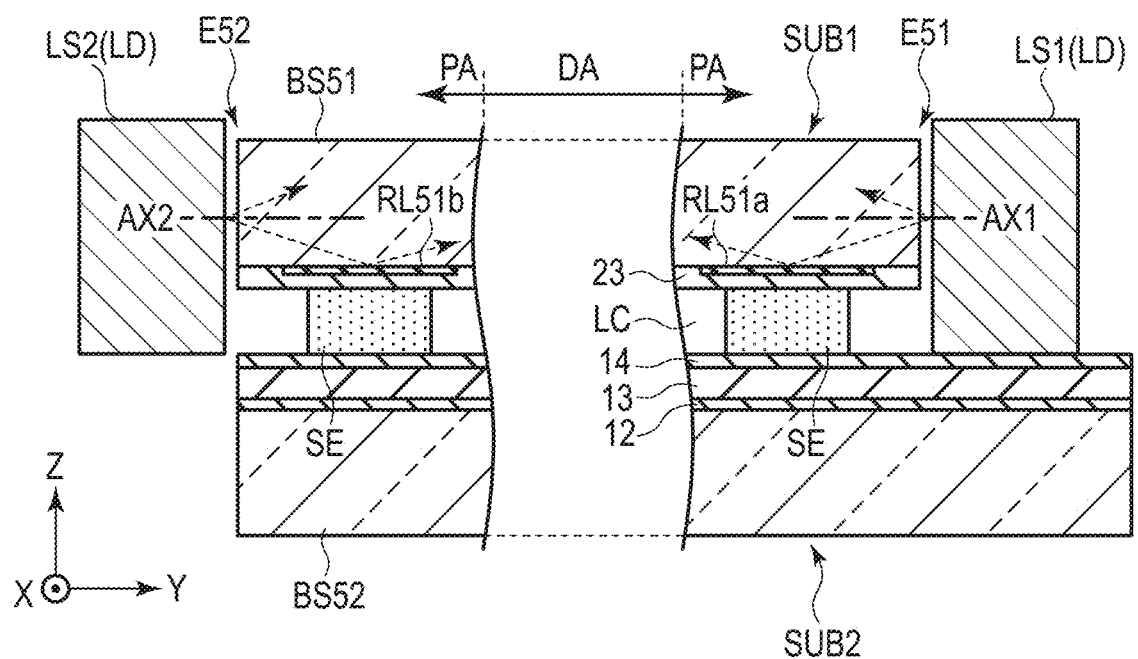
FIG. 15 is a schematic cross-sectional view showing the display device taken along line XV-XV in FIG. 14.

FIG. 15 is a schematic cross-sectional view of the display device DSP taken along line XV-XV in FIG. 14. Note that FIG. 15 illustrates a cross section of an example case where, as in the case of the first reflective layer RL11 in the first embodiment, the first reflective layers RL51a and RL51b are provided in the first substrate SUB1 and the second reflective layers RL52a and RL52b are not provided. A central axis AX1 of the first light source LS1 and a central axis AX2 of the second light source LS2 both oppose the first substrate SUB1. Hereinafter, a transparent substrate of the first substrate SUB1 is referred to as a first transparent substrate BS51, and a transparent substrate of the second substrate SUB2 is referred to as a second transparent substrate BS52.

The first reflective layers RL51a and RL51b are located between the first transparent substrate BS51 and the sealant SE. The first reflective layers RL51a and RL51b can be formed from the same metallic material as that of the light-shielding layer 22 in the same layer as that of the light-shielding layer 22 (see FIG. 9) as in the case of the first reflective layer RL11 in the first embodiment. Apart from this, to the positions of the first reflective layers RL51a and RL51b disposed and the configuration thereof, various examples discussed in connection with the first reflective layer RL11 of the first embodiment are applicable.

As in the example of FIG. 15, when the first reflective layers RL51a and RL51b are provided in the first substrate SUB1, ultraviolet radiation can be irradiated from the second substrate SUB2 to cure the sealant SE, and thus the sealant SE can be easily cured.

With the light sources LS1 and LS2 provided along two opposing edges of the display panel PNL as in this embodiment, the luminance of the display area DA can be equalized. Further, with the first reflective layers RL51a and RL51b provided, the absorption of the light, which is caused by the sealant SE near the light sources LS1 and LS2 can be reduced.

Note that this embodiment discusses an example case where the first light source LS1, the second light source LS2, the first reflective layer RL51a and the first reflective layer RLS1b are disposed along an edge on the terminal area TA side and another edge on an opposite side, respectively. But these members may be placed along some other edges.

Sixth Embodiment

Figure 16:
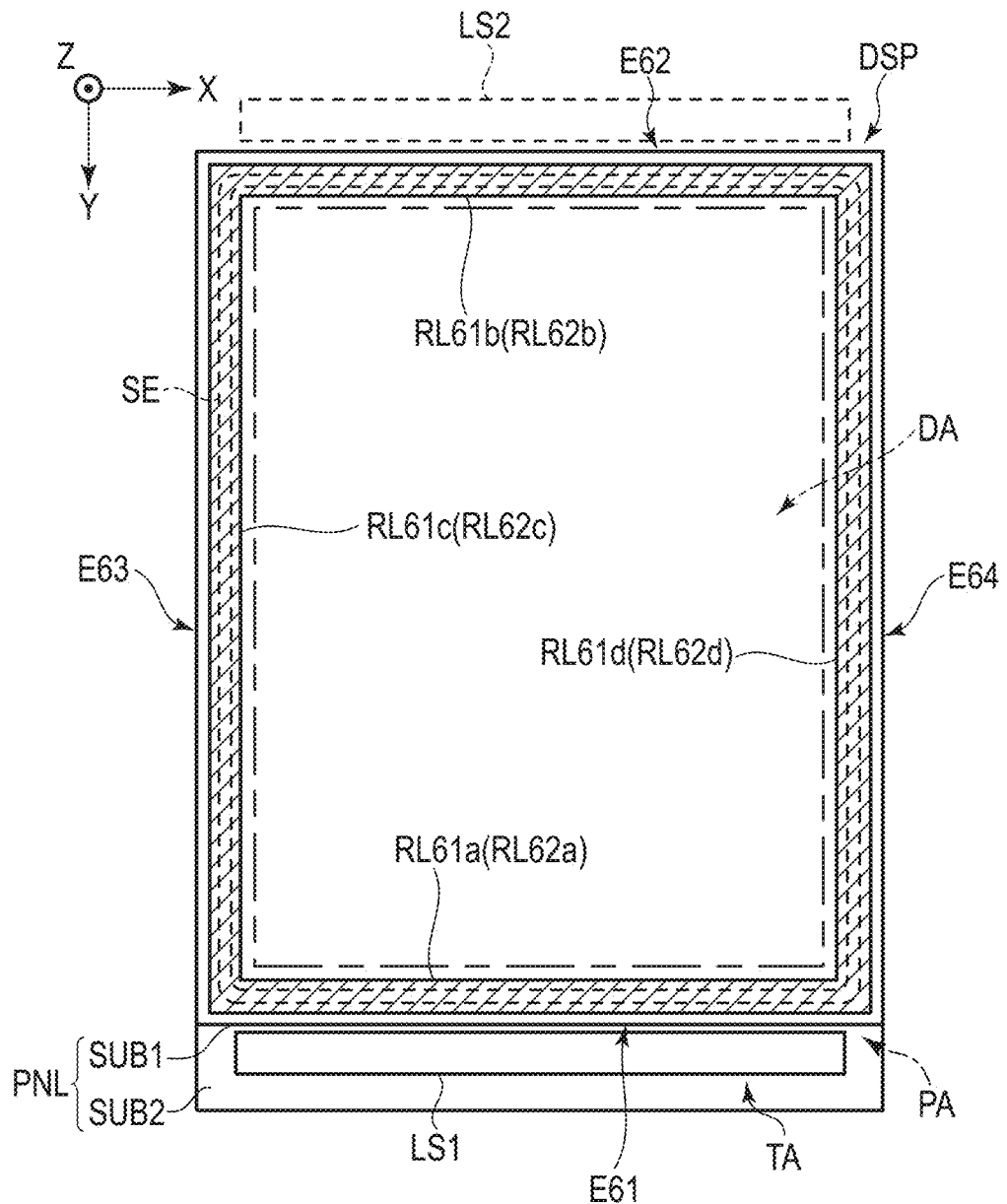
FIG. 16 is a schematic plan view showing a display device of the sixth embodiment.

The sixth embodiment will now be described. As to the structure not to particularly discussed here, a configuration similar to that of each embodiment discussed above is applicable. FIG. 16 is a schematic plan view of a display device DSP of this embodiment. In this embodiment, a first light source LS1 is placed in the terminal area TA. Further, as indicated by a broken line, a second light source LS2 is placed on an opposite side to the terminal area TA.

Further, a first edge E61, a second edge E62, a third edge E63 and a fourth edge E64 of the display panel PNL are defined as illustrated in the drawing. The first edge E61 is equivalent to an edge of the first substrate SUB1, located between the first light source LS1 and the display area DA. The second edge E62 is equivalent to an edge of each of the substrates SUB1 and SUB2 on an opposite side to the terminal area TA. The third edge E63 and the fourth edge E64 are equivalent to edges of each of the substrates SUB1 and SUB2, which are parallel to the second direction Y.

Between the display area DA and the first edge E61, a first reflective layer RL61a, which overlaps a portion of the sealant SE, which is located along the first edge E61, is placed. Between the display area DA and the second edge E62, a first reflective layer RL61b, which overlaps a portion of the sealant SE, located along the second edge E62, is placed. Between the display area DA and the third edge E63, a first reflective layer RL61c, which overlaps a portion of the sealant SE, located along the third edge E63, is placed. Between the display area DA and the fourth edge E64, a first reflective layer RL61d, which overlaps a portion of the sealant SE, located along the fourth edge E64 is placed. To the positions of the planar shape of the first reflective layers RL61a to RL61d and the sealant SE in relation to each other, the cross-sectional structures thereof and the like, a configuration similar to that of the first reflective layer RL11 of the first embodiment or the first reflective layer RL21 of the second embodiment is applicable.

In the example shown in FIG. 16, the first reflective layers RL61a to RL61d are connected to each other. But the first reflective layers RL61a to RL61d may be separated from each other in, for example, bend portions of the sealant SE.

As in the case of the second reflective layer RL32 of the third embodiment, second reflective layers RL62a, RL62b, RL62c and RL62d may be provided to oppose the first reflective layers RL61a to RL61d, respectively. In this case, as in the case of the first reflective layers RL61a to RL61d, the second reflective layers RL62a to RL62d may be connected to or separated from each other.

With the first reflective layers RL61a to RL61d and the second reflective layers RL62a to RL62d, which overlap respective portions of the sealant SE as in this embodiment, the absorption of the light from the first light source LS1 by the sealant SE can be inhibited. Similarly, with the second light source LS2 as well, the absorption of the light from the second light source LS2 by the sealant SE can be inhibited.

Note that this embodiment illustrates a configuration example in which the first light source LS1 is disposed along an edge on the terminal area TA side. But the first light source LS1 may be disposed along some other edge. This is also the case with the second light source LS2, and it should not necessarily be placed along an edge on an opposite side to the the terminal area TA, but may be placed along some other edge.

All of the display devices that can be implemented by a person of ordinary skill in the art through arbitrary design changes to the display devices described above as embodiments of the present invention come within the scope of the present invention as long as they are in keeping with the spirit of the present invention.

Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. An electro-optical device comprising:
    a panel comprising a first transparent substrate, a second transparent substrate opposing the first transparent substrate, an electro-optical area and a peripheral area around the electro-optical area;
    a sealant provided in the peripheral area in plan view, which adheres the first transparent substrate and the second transparent substrate;
    a liquid crystal layer containing a polymer liquid crystal composition and sealed in between the first transparent substrate and the second transparent substrate with the sealant;
    a light source opposing a side surface of the first transparent substrate or the second transparent substrate; and
    a first reflective layer between the first transparent substrate and the second transparent substrate, wherein
    the panel comprises a first edge in plan view,
    the first reflective layer overlaps a portion of the sealant, located along the first edge in plan view, and
    the light source opposes a side surface in the first edge of the first transparent substrate or the second transparent substrate.

2. The electro-optical device of claim 1, wherein
    in section view, a central axis of the light source opposes a side surface of the first transparent substrate, and
    the first reflective layer is between the first transparent substrate and the sealant.

3. The electro-optical device of claim 1, wherein
    the electro-optical area includes a plurality of pixels,
    the panel comprises an pixel electrode provided in each of the plurality of pixels, and a common electrode opposing the pixel electrode, to which a common voltage is applied, and
    the first reflective layer is electroconductive, to which the common voltage is applied.

4. The electro-optical device of claim 1, wherein
    the electro-optical area includes a plurality of pixels,
    the panel comprises a pixel electrode provided in each of the plurality of pixels, a common electrode opposing the pixel electrode, to which a common voltage is applied, and a metal layer provided on borders of the plurality of pixels and electrically connected to the common electrode, and
    the first reflective layer is provided in a same layer as that of the metal layer.

5. The electro-optical device of claim 1, wherein
    the first reflective layer contains aluminum or an aluminum alloy.

6. The electro-optical device of claim 1, wherein
    a width of the first reflective layer is greater than a width of the sealant.

7. The electro-optical device of claim 1, wherein
    the sealant includes a first portion and a second portion, the first portion and the second portion are along the first edge,
    the first portion is between the first edge and the second portion,
    the second portion is between the first portion and the electro-optical area, and
    the first reflective layer overlaps the first portion without overlapping the second portion.

8. The electro-optical device of claim 1, wherein
    the panel comprises a second edge on an opposite side to the first edge, and a third edge connecting the first edge to the second edge,
    the sealant includes a bend portion which bends along a corner portion made by the first edge and the third edge, and
    a width of a portion of the first reflective layer, which overlaps the bend portion is greater than a width of other portions of the first reflective layer.

9. The electro-optical device of claim 1, wherein
    the first reflective layer and the sealant oppose each other via an insulating layer.

10. The electro-optical device of claim 1, further comprising:
    a second reflective layer between the second transparent substrate and the sealant, wherein
    in section view, the light source opposes a side surface of the first transparent substrate, and
    the first reflective layer is between the first transparent substrate and the sealant.

11. The electro-optical device of claim 10, wherein
    the first reflective layer and the second reflective layer oppose each other while interposing the sealant therebetween.

12. The electro-optical device of claim 10, wherein
    a same voltage is applied to the first reflective layer and the second reflective layer.

13. The electro-optical device of claim 1, wherein
    the electro-optical area includes a plurality of pixels,
    the panel comprises a light-shielding layer provided on borders between the plurality of pixels, and
    the first reflective layer is provided in a same layer as that of the light-shielding layer.

14. The electro-optical device of claim 13, wherein
    the light-shielding layer and the first reflective layer are formed of a metallic material.

15. The electro-optical device of claim 14, wherein
    a same voltage is applied to the light-shielding layer and the first reflective layer.

16. The electro-optical device of claim 1, wherein
    a first end portion of the first reflective layer, located near the first edge is between the sealant and the first edge.

17. The electro-optical device of claim 16, wherein
    a second end portion of the first reflective layer, located near the electro-optical area is between the sealant and the electro-optical area.

18. The electro-optical device of claim 17, wherein
    the first reflective layer includes a first area opposing the sealant, a second area between the first area and the first end portion, and a third area between the first area and the second end portion, and
    a width of the second area or the third area is less than a width of the first area.

* * * * *